(12) United States Patent
Wang

(10) Patent No.: US 8,761,638 B2
(45) Date of Patent: Jun. 24, 2014

(54) TONER STORAGE DEVICE AND MULTI-FUNCTION PRINTER

(75) Inventor: Chih-Hwa Wang, New Taipei (TW)

(73) Assignees: Cal-Comp Electronics & Communications Company Limited, New Taipei (TW); Kinpo Electronics, Inc., New Taipei (TW)

(*) Notice: Subject to any disclaimer, the term of this patent is extended or adjusted under 35 U.S.C. 154(b) by 43 days.

(21) Appl. No.: 13/526,493

(22) Filed: Jun. 18, 2012

(65) Prior Publication Data

US 2013/0101312 A1     Apr. 25, 2013

(30) Foreign Application Priority Data

Oct. 20, 2011  (TW) .............................. 100138074 A

(51) Int. Cl.
| | |
|---|---|
| *G03G 15/10* | (2006.01) |
| *G03G 15/08* | (2006.01) |
| *G03G 21/10* | (2006.01) |
| *G03G 21/12* | (2006.01) |

(52) U.S. Cl.
CPC ........ *G03G 15/0832* (2013.01); *G03G 15/0834* (2013.01); *G03G 21/10* (2013.01); *G03G 21/12* (2013.01); *G03G 2212/0665* (2013.01)
USPC .......................................................... 399/120

(58) Field of Classification Search
CPC ....................................................... G03G 15/08
USPC .......................................................... 399/120
See application file for complete search history.

(56) References Cited

U.S. PATENT DOCUMENTS 5,289,241 A    2/1994   Sugiyama et al.

*Primary Examiner* — Clayton E LaBalle
*Assistant Examiner* — Kevin Butler
(74) *Attorney, Agent, or Firm* — Jianq Chyun IP Office

(57) ABSTRACT

A toner storage device adapted to accommodate a printing toner and a recycling toner and multi-function printer using the same are provided. The toner storage device includes a body and a partition. The body has an accommodating cavity. The partition is installed in the accommodating cavity of the body to make the accommodating cavity partitioned into a first sub-accommodating space and a second sub-accommodating space, wherein a volume of the first sub-accommodating space and a volume of the second sub-accommodating space of the accommodating cavity are varied with an amount of the printing toner and an amount of the recycling toner.

15 Claims, 4 Drawing Sheets

TONER STORAGE DEVICE AND MULTI-FUNCTION PRINTER

CROSS-REFERENCE TO RELATED APPLICATION

This application claims the priority benefit of Taiwan application serial no. 100138074, filed on Oct. 20, 2011. The entirety of the above-mentioned patent application is hereby incorporated by reference herein and made a part of this specification.

BACKGROUND OF THE INVENTION

1. Field of the Invention

The present invention generally relates to a toner storage device and a multi-function printer, in particular, to a toner storage device capable of accommodating a printing toner and a recycling toner and multi-function printer.

2. Description of Related Art

As the prices of laser printers and inkjet printers become increasingly lower and the printing effect with high quality, the laser printers and the inkjet printers gradually become indispensable electronic products for individuals or families. Especially in view of photo printing functions, laser printers and inkjet printers already can reach the quality level of professional photo finishing shops, making personal photos and images of color/black-white documents closer to the natural and the vivid colors. Moreover, by using a high transmission rate interface (for example, a USB transmission interface), the transmission rate of the printer during large-size and high-resolution printing can be increased, making it more convenient and efficient for users to print high-quality photos.

For a laser printer, a toner cartridge attaches a toner onto a development roller, and when a laser is used to illuminate a photoreceptor drum, a potential difference is formed on the photoreceptor drum, and the toner on the development roller is attracted to generate an electrostatic latent image, which is then transferred onto a piece of paper by a transfer roller. However, currently, an excess of the toner removed from the photoreceptor drum, the development roller or the transfer roller during printing is mostly accommodated in a recycling container installed in the printer, and the recycled toner is usually discarded rather than reused.

SUMMARY OF THE INVENTION

Accordingly, the present invention is directed to a toner storage device capable of accommodating a printing toner and a recycling toner at the same time.

The present invention is also directed to a multi-function printer, which includes a toner storage device capable of accommodating a printing toner and a recycling toner at the same time, so as to reduce the number of parts installed in the multi-function printer.

The present invention provides a toner storage device, which is adapted to accommodate a printing toner and a recycling toner, and includes a body and a partition. The body has an accommodating cavity. The partition is installed in the accommodating cavity of the body to make the accommodating cavity partitioned into a first sub-accommodating space and a second sub-accommodating space, in which a volume of the first sub-accommodating space and a volume of the second sub-accommodating space of the accommodating cavity are varied with an amount of the printing toner and an amount of the recycling toner.

In an embodiment of the toner storage device of the present invention, the body further has a first opening and a second opening. The first opening is communication with the first sub-accommodating space, and the second opening is communication with the second sub-accommodating space. The printing toner is output from the first sub-accommodating space through the first opening, and the recycling toner is input into the second sub-accommodating space through the second opening.

In an embodiment of the toner storage device of the present invention, when the amount of the printing toner is greater than the amount of the recycling toner, the partition protrudes towards the recycling toner. When the amount of the recycling toner is greater than the amount of the printing toner, the partition protrudes towards the printing toner.

In an embodiment of the toner storage device of the present invention, the material of the partition is a film, rubber or resin.

In an embodiment of the toner storage device of the present invention, the toner storage device further includes a solenoid valve element and a metal sheet. The solenoid valve element is disposed on the body or the partition, and the metal sheet faces the solenoid valve element and is disposed on the partition or the body corresponding to the solenoid valve element. When the solenoid valve element draws the metal sheet, the partition protrudes towards the printing toner.

In an embodiment of the toner storage device of the present invention, the toner storage device further includes a solenoid valve element disposed on the body, and the material of the partition is a magnetically sensitive material. When the solenoid valve element draws the partition, the partition protrudes towards the printing toner.

In an embodiment of the toner storage device of the present invention, the partition is a flexible partition, capable of being curved under a force to adjust a protruding position of the flexible partition.

The present invention provides a multi-function printer, which includes a printer body, a printing unit and a toner storage device. The printing unit is installed in the printer body, and the toner storage device is adjacent to the printing unit and adapted to accommodate a printing toner and a recycling toner. The toner storage device includes a body and a partition. The body has an accommodating cavity. The partition is installed in the accommodating cavity of the body to make the accommodating cavity partitioned into a first sub-accommodating space and a second sub-accommodating space, in which a volume of the first sub-accommodating space and a volume of the second sub-accommodating space of the accommodating cavity are varied with an amount of the printing toner and an amount of the recycling toner.

In an embodiment of the multi-function printer of the present invention, the body further has a first opening and a second opening. The first opening is communication with the first sub-accommodating space, and the second opening is communication with the second sub-accommodating space. The printing toner is output from the first sub-accommodating space through the first opening, and the recycling toner is input into the second sub-accommodating space through the second opening.

In an embodiment of the multi-function printer of the present invention, when the amount of the printing toner is greater than the amount of the recycling toner, the partition protrudes towards the recycling toner. When the amount of the recycling toner is greater than the amount of the printing toner, the partition protrudes towards the printing toner.

In an embodiment of the multi-function printer of the present invention, the material of the partition is a film, rubber or resin.

In an embodiment of the multi-function printer of the present invention, the toner storage device further includes a solenoid valve element and a metal sheet. The solenoid valve element is disposed on the body or the partition, and the metal sheet faces the solenoid valve element and is disposed on the partition or the body corresponding to the solenoid valve element. When the solenoid valve element draws the metal sheet, the partition protrudes towards the printing toner.

In an embodiment of the multi-function printer of the present invention, the toner storage device further includes a solenoid valve element disposed on the body, and the material of the partition is a magnetically sensitive material. When the solenoid valve element draws the partition, the partition protrudes towards the printing toner.

In an embodiment of the multi-function printer of the present invention, the partition is a flexible partition, capable of being curved under a force to adjust a protruding position of the flexible partition.

In an embodiment of the multi-function printer of the present invention, the printing unit includes a photoreceptor drum, a development roller and a transfer belt. The photoreceptor drum is located between the development roller and the transfer belt, and the toner storage device is located between the photoreceptor drum and the transfer belt. In addition, the multi-function printer further includes a first toner conveying element and a second toner conveying element. The first toner conveying element is adjacent to the development roller, and the first toner conveying element delivers the printing toner onto the development roller through the first opening. The second toner conveying element is located between the photoreceptor drum and the toner storage device, and the second toner conveying element delivers an excess of the printing toner to the second sub-accommodating space for recycling through the second opening. The first toner conveying element or the second toner conveying element is a belt or a screw.

Based on the above, the partition of the toner storage device of the present invention makes the accommodating cavity of the body partitioned into a plurality of sub-accommodating spaces for respectively accommodating the printing toner and the recycling toner. Thus, the printing toner and the recycling toner are accommodated in the same body, which can reduce the number of parts in the multi-function printer using the toner storage device, thereby reducing the manufacturing cost.

In order to make the aforementioned features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
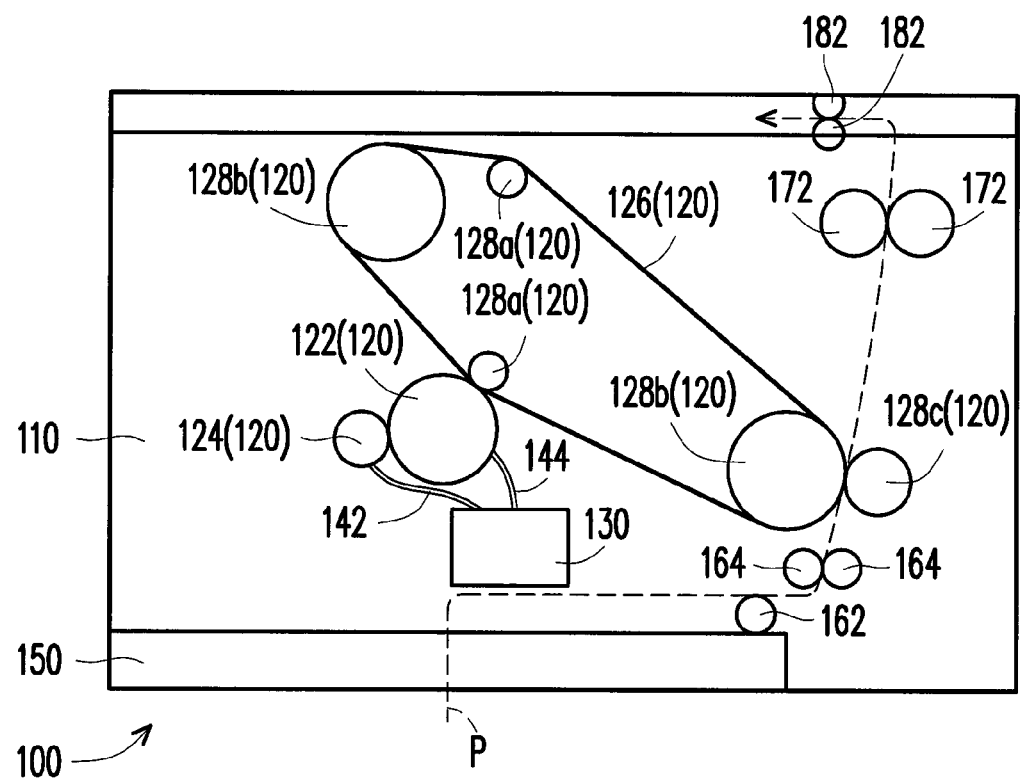
FIG. 1 is a schematic view of a multi-function printer according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
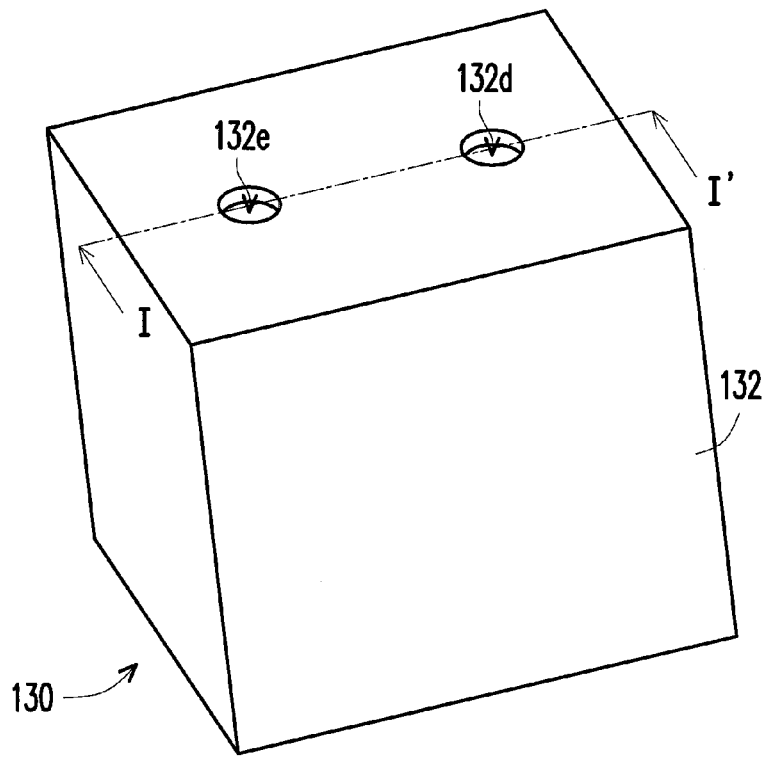
FIG. 2 is a three-dimensional view of a toner storage device of FIG. 1.
Figure 3:
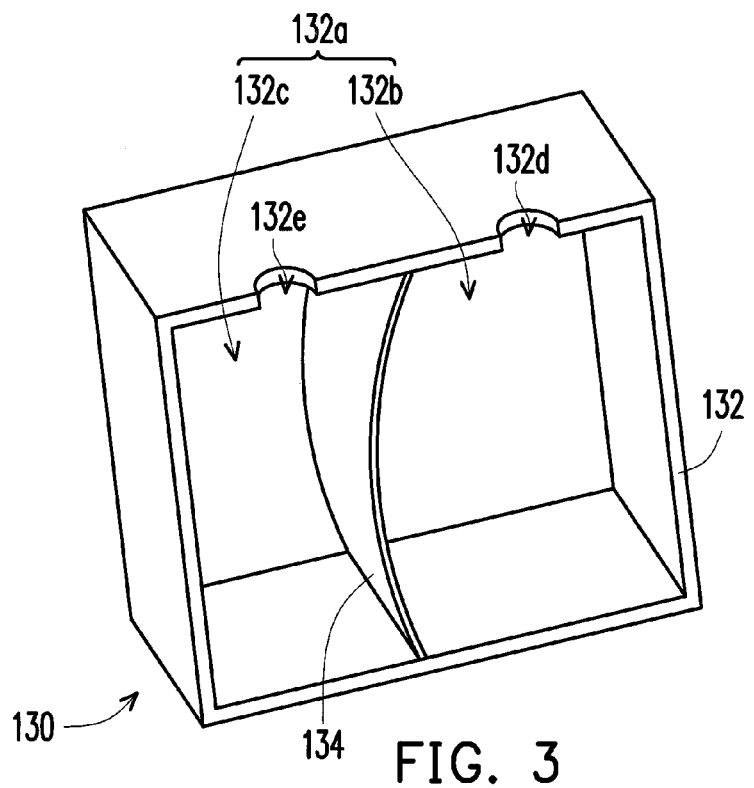
FIG. 3 is a partial cross-sectional view of the toner storage device of FIG. 2 along Line I-I'.

FIG. 1 is a schematic view of a multi-function printer according to an embodiment of the present invention. FIG. 2 is a three-dimensional view of a toner storage device of FIG. 1. FIG. 3 is a partial cross-sectional view of the toner storage device of FIG. 2 along Line I-I'. Referring to FIG. 1, FIG. 2 and FIG. 3, in this embodiment, the multi-function printer 100 includes a printer body 110, a printing unit 120 and a toner storage device 130. The printing unit 120 is installed in the printer body 110. The toner storage device 130 is adjacent to the printing unit 120 and adapted to accommodate a printing toner and a recycling toner. The toner storage device 130 includes a body 132 and a partition 134. The body 132 has an accommodating cavity 132a. The partition 134 is installed in the accommodating cavity 132a of the body 132 to make the accommodating cavity 132a partitioned into a first sub-accommodating space 132b and a second sub-accommodating space 132c. The printing toner is accommodated in the first sub-accommodating space 132b of the accommodating cavity 132a, the recycling toner is accommodated in the second sub-accommodating space 132c of the accommodating cavity 132a, and a volume of the first sub-accommodating space 132b and a volume of the second sub-accommodating space 132c of the accommodating cavity 132a are varied with an amount of the printing toner and an amount of the recycling toner. As a plurality of sub-accommodating spaces (that is, the first sub-accommodating space 132b and the second sub-accommodating space 132c) is partitioned in the body 132 by the partition 134, the printing toner and the recycling toner can be located in the same body 132 and respectively accommodated in different sub-accommodating spaces. Therefore, the number of parts in the multi-function printer 100 can be reduced, so as to reduce the manufacturing cost.

Figure 4:
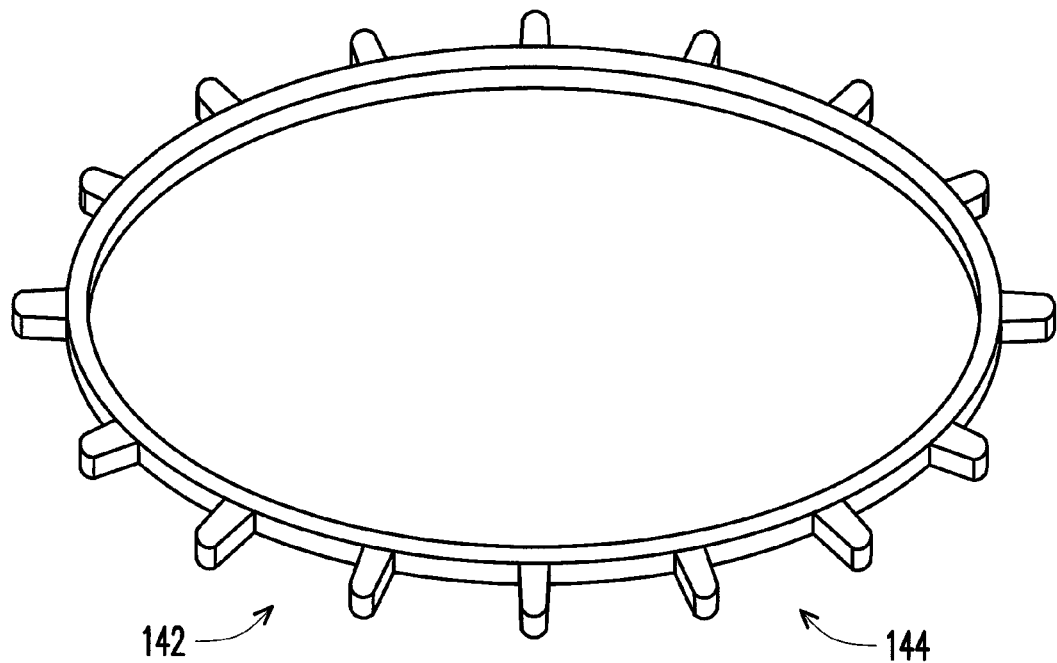
FIG. 4 is a three-dimensional view of a first toner conveying element and a second toner conveying element according to an embodiment of the present invention.
Figure 5:
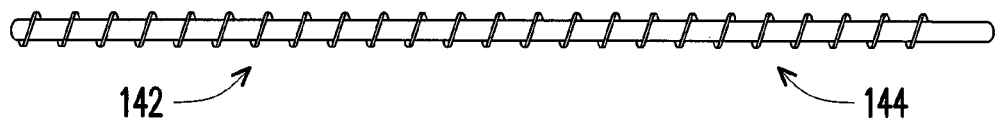
FIG. 5 is a three-dimensional view of a first toner conveying element and a second toner conveying element according to another embodiment of the present invention.

According to the above, the printing unit 120 includes a photoreceptor drum 122, a development roller 124 and a transfer belt 126. The transfer belt 126 may be driven by a plurality of transfer rollers 128a, 128b and 128c. The photoreceptor drum 122 is located between the development roller 124 and the transfer belt 126, and the toner storage device 130 is located between the photoreceptor drum 122 and the transfer belt 126. In addition, the body 132 of the toner storage device 130 further has a first opening 132d and a second opening 132e. The first opening 132d is communication with the first sub-accommodating space 132b, and the second opening 132e is communication with the second sub-accommodating space 132c. The printing toner is output from the first sub-accommodating space 132b through the first opening 132d, and the recycling toner is input into the second sub-accommodating space 132c through the second opening 132e. Moreover, the multi-function printer 100 further includes a first toner conveying element 142 and a second toner conveying element 144. The first toner conveying element 142 is adjacent to the development roller 124, and the first toner conveying element 142 delivers the printing toner onto the development roller 124 through the first opening 132d. The second toner conveying element 144 is located between the photoreceptor drum 122 and the toner storage device 130, and the second toner conveying element 144 delivers an excess of the printing toner to the second sub-accommodating space 132c for recycling through the second opening 132e. The first toner conveying element 142 and the second toner conveying element 144 may respectively be a belt (as shown in FIG. 4), a screw (as shown in FIG. 5), or a combination thereof as required.

After a piece of paper (not shown) is fed through a paper feed tray 150 of the multi-function printer 100, the paper moves along a paper feed path P along with rotation of pickup rollers 162 and 164. After the first toner conveying element 142 delivers the printing toner to the development roller 124 through the first opening 132d of the body 132 of the toner storage device 130, the paper passes through the development roller 124, the photoreceptor drum 122 and the transfer belt 126 of the printing unit 120 and a fuser roller 172 in sequence, and the paper is printed and then output by an exit roller 182. After an excess of the toner on the development roller 124, the photoreceptor drum 122 or the transfer belt 126 is scraped, the excess of the toner is delivered by the second toner conveying element 144 to the second opening 132e of the body 132 of the toner storage device 130 and becomes the recycling toner. The partition 134 is elastic, and for example, may be made of a film, rubber or resin. The amount of the printing toner and the amount of the recycling toner influence the shape of the partition 134. For example, when the amount of the printing toner is greater than the amount of the recycling toner, the partition 134 protrudes towards the second sub-accommodating space 132c for the recycling toner under the gravity (as shown in FIG. 3). As the printing workload of the multi-function printer 100 increases, the amount of the printing toner gradually decreases, and the amount of the recycling toner gradually increases. Accordingly, when the amount of the recycling toner is greater than the amount of the printing toner, the partition 134 protrudes towards the first sub-accommodating space 132b for the printing toner. Therefore, the volume of the first sub-accommodating space 132b and the volume of the second sub-accommodating space 132c of the body 132 of the toner storage device 130 are varied with the printing workload of the multi-function printer 100.

Figure 6A:
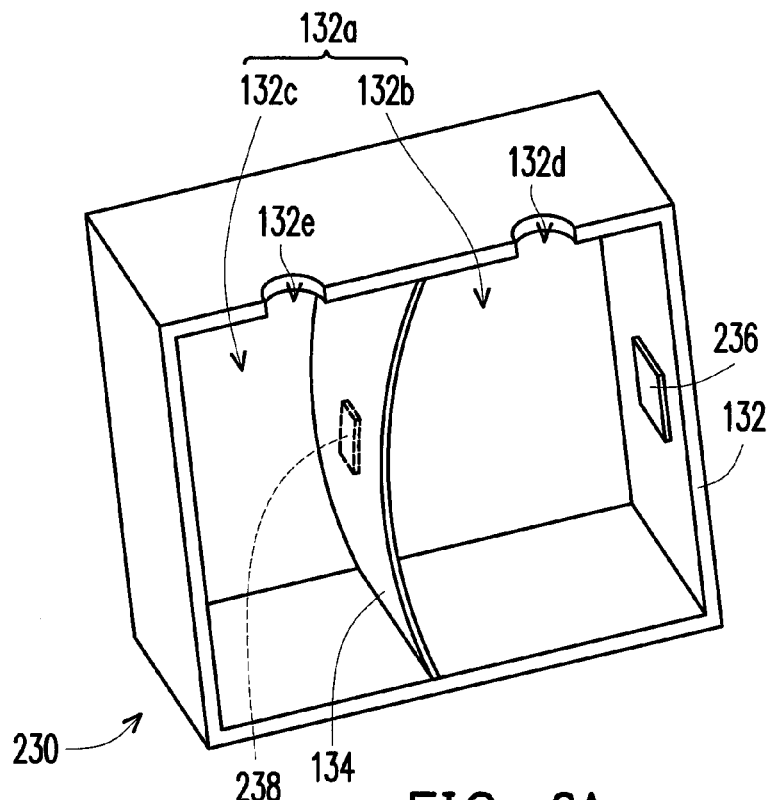
FIG. 6A is a partial cross-sectional view of a toner storage device according to another embodiment of the present invention.

Moreover, in addition to enabling the partition to be flexible under the gravity, other elements may also be disposed in the toner storage device to enable the partition to be flexible. Several embodiments are illustrated below by way of example. FIG. 6A is a partial cross-sectional view of a toner storage device according to another embodiment of the present invention. Referring to FIG. 6A, in this embodiment, the toner storage device 230 is similar to the toner storage device 130 of FIG. 3, so only the difference between this embodiment and the embodiment of FIG. 3 is introduced below, and the same or like reference numerals represent the same or like elements. The toner storage device 230 further includes a solenoid valve element 236 and a metal sheet 238. The solenoid valve element 236 is disposed on the body 132 or the partition 134, and the metal sheet 238 faces the solenoid valve element 236 and is disposed on the partition 134 or the body 132 corresponding to the solenoid valve element 236. When the solenoid valve element 236 is energized, and the solenoid valve element 236 gradually draws the metal sheet 238, the partition 134 protrudes towards the printing toner. In this way, the volume of the second sub-accommodating space 132c is greater than that of the first sub-accommodating space 132b, so as to be used for accommodating the recycling toner. It should be noted that, although FIG. 6A shows that the solenoid valve element 236 is disposed on the body 132 and the metal sheet 238 is disposed on the partition 134, a user may adjust the positions of the solenoid valve element 236 and the metal sheet 238 according to actual requirements. For example, in another embodiment not shown, the solenoid valve element 236 is disposed on the partition 134, and the metal sheet 238 is disposed on the body 132.

The partition 134 of this embodiment may be a flexible partition, capable of being curved under a force to adjust a protruding position of the flexible partition. For example, the user may dispose a motor (not shown) in the multi-function printer 100, and the motor is connected to the flexible partition. When the motor operates, the motor can push the flexible partition to move. Thus, the volume of the first sub-accommodating space 132b and the volume of the second sub-accommodating space 132c can be changed. In addition, in another embodiment, the user disposes an operating rod in the toner storage device 130, and the operating rod is connected to the partition 134. When the user pulls the operating rod, the partition 134 can be bent, so as to change the volume of the first sub-accommodating space 132b and the volume of the second sub-accommodating space 132c.

Figure 6B:
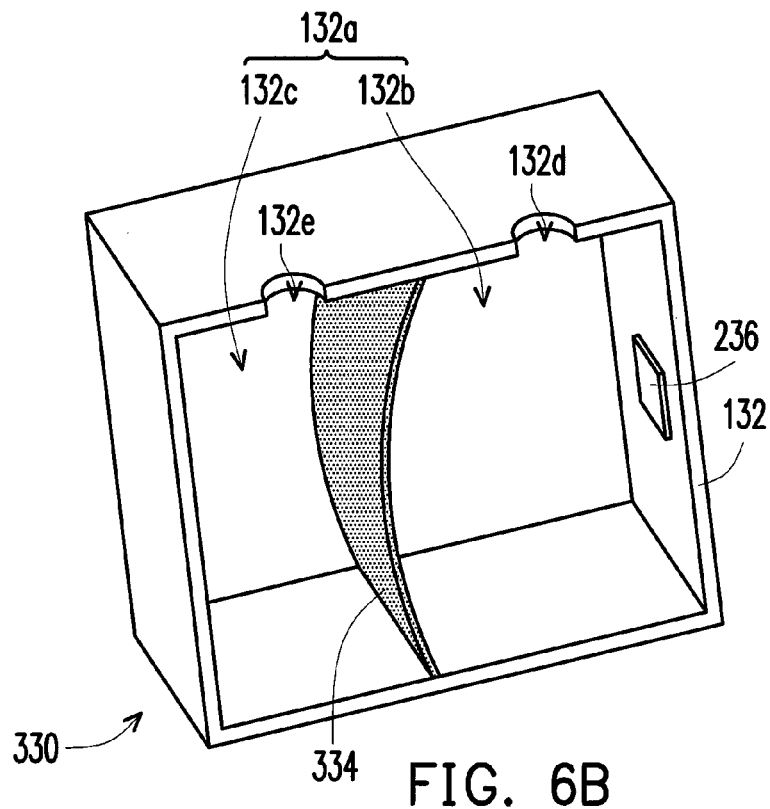
FIG. 6B is a partial cross-sectional view of a toner storage device according to still another embodiment of the present invention.

FIG. 6B is a partial cross-sectional view of a toner storage device according to still another embodiment of the present invention. Referring to FIG. 6B, in this embodiment, the toner storage device 330 is similar to the toner storage device 230 of FIG. 6A, so only the difference between this embodiment and the embodiment of FIG. 6A is introduced below, and the same or like reference numerals represent the same or like elements. The toner storage device 330 further includes a solenoid valve element 236 disposed on the body 132, and the material of a partition 334 is a magnetically sensitive material. When the solenoid valve element 236 is energized, and the solenoid valve element 236 gradually draws the partition 334, the partition 334 protrudes towards the printing toner. In this way, the volume of the second sub-accommodating space 132c is greater than that of the first sub-accommodating space 132b, so as to be used for accommodating the recycling toner.

In another embodiment not shown, the multi-function printer 100 may further include a sensor, and the sensor may be installed on the partition 134 and used for sensing an amount of deformation of the partition 134, so as to detect the residual amount of the printing toner, and thus enable the user to know whether the toner storage device 130 needs to be replaced.

Based on the above, the toner storage device of the present invention uses the partition to make the body partitioned into a plurality of sub-accommodating spaces, so that the printing toner and the recycling toner can be located in different sub-accommodating spaces of the same body. Therefore, for the multi-function printer using the toner storage device, the number of parts in the multi-function printer can be reduced, so as to reduce the manufacturing cost of the multi-function printer.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A toner storage device, adapted to accommodate a printing toner and a recycling toner, the toner storage device comprising:
   a body, having an accommodating cavity; and
   a partition, installed in the accommodating cavity of the body to make the accommodating cavity partitioned into a first sub-accommodating space and a second sub-accommodating space, wherein when the amount of the printing toner is greater than the amount of the recycling toner, the partition protrudes towards the recycling toner, and when the amount of the recycling toner is greater than the amount of the printing toner, the partition protrudes towards the printing toner, such that a volume of the first sub-accommodating space and a volume of the second sub-accommodating space of the accommodating cavity are varied with an amount of the printing toner and an amount of the recycling toner.

2. The toner storage device according to claim 1, wherein the body further has a first opening and a second opening, the first opening is communication with the first sub-accommodating space, the second opening is communication with the second sub-accommodating space, the printing toner is output from the first sub-accommodating space through the first opening, and the recycling toner is input into the second sub-accommodating space through the second opening.

3. The toner storage device according to claim 1, wherein the material of the partition is a film, rubber or resin.

4. The toner storage device according to claim 1, further comprising a solenoid valve element and a metal sheet, wherein the solenoid valve element is disposed on the body or the partition, the metal sheet faces the solenoid valve element and is disposed on the partition or the body corresponding to the solenoid valve element, and when the solenoid valve element draws the metal sheet, the partition protrudes towards the printing toner.

5. The toner storage device according to claim 1, further comprising a solenoid valve element disposed on the body, wherein the material of the partition is a magnetically sensitive material, and when the solenoid valve element draws the partition, the partition protrudes towards the printing toner.

6. The toner storage device according to claim 1, wherein the partition is a flexible partition, capable of being curved under a force to adjust a protruding position of the flexible partition.

7. A multi-function printer, comprising:
   a printer body;
   a printing unit, installed in the printer body; and
   a toner storage device, adjacent to the printing unit and adapted to accommodate a printing toner and a recycling toner, the toner storage device comprising:
   a body, having an accommodating cavity; and
   a partition, installed in the accommodating cavity of the body to make the accommodating cavity partitioned into a first sub-accommodating space and a second sub-accommodating space, wherein when the amount of the printing toner is greater than the amount of the recycling toner, the partition protrudes towards the recycling toner, and when the amount of the recycling toner is greater than the amount of the printing toner, the partition protrudes towards the printing toner, such that a volume of the first sub-accommodating space and a volume of the second sub-accommodating space of the accommodating cavity are varied with an amount of the printing toner and an amount of the recycling toner.

8. The multi-function printer according to claim 7, wherein the body further has a first opening and a second opening, the first opening is communication with the first sub-accommodating space, the second opening is communication with the second sub-accommodating space, the printing toner is output from the first sub-accommodating space through the first opening, and the recycling toner is input into the second sub-accommodating space through the second opening.

9. The multi-function printer according to claim 7, wherein the material of the partition is a film, rubber or resin.

10. The multi-function printer according to claim 7, wherein the toner storage device further comprises a solenoid valve element and a metal sheet, the solenoid valve element is disposed on the body or the partition, the metal sheet faces the solenoid valve element and is disposed on the partition or the body corresponding to the solenoid valve element, and when the solenoid valve element draws the metal sheet, the partition protrudes towards the printing toner.

11. The multi-function printer according to claim 7, wherein the toner storage device further comprises a solenoid valve element disposed on the body, the material of the partition is a magnetically sensitive material, and when the solenoid valve element draws the partition, the partition protrudes towards the printing toner.

12. The multi-function printer according to claim 7, wherein the partition is a flexible partition, capable of being curved under a force to adjust a protruding position of the flexible partition.

13. The multi-function printer according to claim 7, wherein the printing unit comprises a photoreceptor drum, a development roller and a transfer belt, the photoreceptor drum is located between the development roller and the transfer belt, and the toner storage device is located between the photoreceptor drum and the transfer belt.

14. The multi-function printer according to claim 13, further comprising a first toner conveying element and a second toner conveying element, wherein the first toner conveying element is adjacent to the development roller, the first toner conveying element delivers the printing toner onto the development roller through the first opening, the second toner conveying element is located between the photoreceptor drum and the toner storage device, and the second toner conveying element delivers an excess of the printing toner to the second sub-accommodating space for recycling through the second opening.

15. The multi-function printer according to claim 14, wherein the first toner conveying element or the second toner conveying element is a belt or a screw.

* * * * *